United States Patent
Warsop et al.

(10) Patent No.: US 12,145,717 B2
(45) Date of Patent: Nov. 19, 2024

(54) CONTROLLER PROVIDING LINEAR FLUIDIC CONTROL RESPONSES TO VEHICLE MANOUEUVRE INPUTS

(71) Applicant: BAE Systems plc, London (GB)

(72) Inventors: Clyde Warsop, Bristol (GB); William James Crowther, Manchester (GB); Ian Lunnon, Manchester (GB)

(73) Assignee: BAE Systems plc, London (GB)

( * ) Notice: Subject to any disclaimer, the term of this patent is extended or adjusted under 35 U.S.C. 154(b) by 300 days.

(21) Appl. No.: 17/635,628

(22) PCT Filed: Sep. 3, 2020

(86) PCT No.: PCT/GB2020/052102
§ 371 (c)(1),
(2) Date: Feb. 15, 2022

(87) PCT Pub. No.: WO2021/044141
PCT Pub. Date: Mar. 11, 2021

(65) Prior Publication Data
US 2022/0324552 A1    Oct. 13, 2022

(30) Foreign Application Priority Data

Sep. 3, 2019 (GB) ..................................... 1912636
Oct. 22, 2019 (EP) ..................................... 19275104

(51) Int. Cl.
*B64C 15/14* (2006.01)
*B64U 40/20* (2023.01)
*G05D 7/06* (2006.01)

(52) U.S. Cl.
CPC .............. *B64C 15/14* (2013.01); *B64U 40/20* (2023.01); *G05D 7/0635* (2013.01)

(58) Field of Classification Search
CPC .............................. B64C 15/14; G05D 7/0635
See application file for complete search history.

(56) References Cited

U.S. PATENT DOCUMENTS

| 2,451,008 A | 10/1948 | Williams |
| 2,928,627 A | 3/1960 | Johnson |

(Continued)

FOREIGN PATENT DOCUMENTS

| EP | 0518345 A1 | 12/1992 |
| EP | 2059441 A1 | 3/2008 |

(Continued)

OTHER PUBLICATIONS

PCT International Search Report and Written Opinion of PCT Application No. PCT/GB2020/052104, mail date Nov. 4, 2020, 14 pages.

(Continued)

*Primary Examiner* — Jess Whittington
(74) *Attorney, Agent, or Firm* — Maine Cernota & Curran

(57) ABSTRACT

A vehicle control system (110) for use with at least one fluidic control effector (102) for a vehicle, the vehicle control system (110) comprising a controller (110), wherein the controller is configured to: receive a vehicle control input indicating a demanded vehicle manoeuvre, wherein the input is further configured to receive condition data; determine a fluid mass-flow for the at least one fluid control effector based on the received vehicle control input and the condition data, wherein the relationship between the fluid mass-flow and the vehicle control input is substantially non-linear; and output data relating to the determined fluid mass-flow to effect the demanded vehicle manoeuvre, wherein the fluid mass-flow is determined to provide a substantially linear relationship between the vehicle control input and the effected demanded vehicle manoeuvre.

19 Claims, 5 Drawing Sheets

(56) References Cited

U.S. PATENT DOCUMENTS

| | | | |
|---|---|---|---|
| 2,946,540 | A | 7/1960 | Henri |
| 2,969,206 | A | 1/1961 | Jensen |
| 3,246,863 | A | 4/1966 | Posingies |
| 3,920,203 | A | 11/1975 | Moorehead |
| 4,534,702 | A | 8/1985 | Johnson, Jr. |
| 4,713,935 | A * | 12/1987 | Szuminski ............. B64D 33/04 60/229 |
| 4,860,976 | A | 8/1989 | McFadden |
| 5,899,416 | A | 5/1999 | Meister |
| 7,104,499 | B1 | 9/2006 | Arata |
| 7,823,840 | B2 | 11/2010 | Shmivolich |
| 8,033,510 | B2 * | 10/2011 | Shmilovich ............... B64C 9/22 244/209 |
| 8,087,618 | B1 | 1/2012 | Shmilovich |
| 8,191,820 | B1 | 6/2012 | Westra |
| 9,108,725 | B1 | 8/2015 | Shmilovich |
| 9,573,679 | B2 | 2/2017 | Golling |
| 9,587,585 | B1 | 3/2017 | Rolling |
| 9,656,740 | B2 | 5/2017 | Golling |
| 9,714,082 | B2 | 7/2017 | Shmilovich |
| 9,889,924 | B2 | 2/2018 | Harrison |
| 9,944,383 | B2 | 4/2018 | Williams |
| 10,556,671 | B2 | 2/2020 | Warsop |
| 10,611,465 | B2 | 4/2020 | Lee |
| 10,787,245 | B2 | 9/2020 | Duffy |
| 11,149,633 | B2 | 10/2021 | Wang |
| 2001/0045311 | A1 * | 11/2001 | Miyazawa ............... B60V 3/04 104/23.2 |
| 2009/0050734 | A1 * | 2/2009 | Cook ...................... B64C 15/14 244/99.5 |
| 2009/0277519 | A1 * | 11/2009 | Parker ................... F15B 19/002 137/625.65 |
| 2014/0103134 | A1 | 4/2014 | Raghu |
| 2015/0275758 | A1 | 10/2015 | Foutch |
| 2016/0068270 | A1 | 3/2016 | Meyer |
| 2017/0057621 | A1 * | 3/2017 | Evulet ..................... B64C 21/04 |
| 2017/0081031 | A1 | 3/2017 | Bammann |
| 2017/0088253 | A1 * | 3/2017 | Williams ................ B64C 15/14 |
| 2022/0315208 | A1 | 10/2022 | Warsop |

FOREIGN PATENT DOCUMENTS

| | | | |
|---|---|---|---|
| EP | 3144221 | A1 | 3/2017 |
| GB | 1448017 | A | 10/1973 |

OTHER PUBLICATIONS

Magill J et al: "Dynamic Stall Control Using a Model-Based Observer", Journal of Aircraft. AIAA—American Institute of Aeronautics and Astronautics, Inc, US, vol. 40, No. 2, Mar. 1, 2003 (Mar. 1, 2003), pp. 355-362, XP001144377, ISSN:0021-8669.

European Search Report Application No. EP 19275103.0, mail date Apr. 6, 2020, 8 pages.

Great Britain Search Report Application No. GB 1912638.2, mail date Feb. 17, 2020, 4 pages.

Dressel L and M Kochenderfer: "Hunting Drones with Other Drones: Tracking a Moving Radio Target", 2019 International Conference on Robotics and Automation (ICRA), May 20-24, 2019, 1905-1912, Montreal, Canada.

Davies L et al: "Review of Unmanned Aircraft System Technologies to Enable Beyond Visual Line of Sight (BVLOS) Operations," 2018 X International Conference of Electrical Power Drive Systems (ICEPDS), 2018.

PCT International Search Report and Written Opinion of PCT Application No. PCT/GB2020/052102, mail date Nov. 2, 2020, 14 pages.

Lino Guzzella et al: "Introduction to Modeling and Control of Internal Combustion Engine Systems—A Basics of Modeling and Control-Systems Theory", Jan. 1, 2010 (Jan. 1, 2010), pp. 221-354, XP055686981, Retrieved from the Internet: URL: https://link.springer.com/content/pdf/bbm:978-3-642-10775-7/1.pdf [retreived on Apr. 14, 2020] p. 261-p. 264.

European Search Report Application No. 19275104.8, mail date Apr. 29, 2020, 10 pages.

Great Britain Search Report Application No. 1912636.6, mail date Feb. 17, 2020, 4 pages.

International Preliminary Report on Patentability of PCT Application No. PCT/GB2020/052102, mail date Mar. 17, 2022, 8 pages.

International Preliminary Report on Patentability of PCT Application No. PCT/GB2020/052104, mail date Mar. 17, 2022, 8 pages.

Office Action for U.S. Appl. No. 17/635,574 mail date Nov. 24, 2023, 27 pages.

Notice of Allowance for U.S. Appl. No. 17/635,574 mail date May 23, 2024, 11 pages.

Final Office Action for U.S. Appl. No. 17/635,574 mail date Mar. 15, 2024, 20 pages.

* cited by examiner

CONTROLLER PROVIDING LINEAR FLUIDIC CONTROL RESPONSES TO VEHICLE MANOUEUVRE INPUTS

RELATED APPLICATIONS

This application is a national phase application filed under 35 USC § 371 of PCT Application No. PCT/GB2020/052102 with an International filing date of Sep. 3, 2020, which claims priority of GB Patent Application 1912636.6 filed Sep. 3, 2019, and of EP Patent Application 19275104.8 filed on Oct. 22, 2019. All of these applications are incorporated herein by reference in their entirety for all purposes.

FIELD

The present invention relates to fluidic control of vehicles.

BACKGROUND

Conventional aircraft use what are referred to as 'conventional control surfaces' to allow them to be trimmed and manoeuvred in flight. These conventional control surfaces, such as flaps, ailerons, elevons, rudders, elevators, are usually in the form of moveable parts of the structure that are normally located at the leading and/or trailing edges of wings and tail surfaces. example. The moveable parts can also be completely moving parts, for example, the canard, fin or horizontal tail. The movement of these conventional control surfaces changes the external geometry of the aircraft and results in changes to the flow around it.

These geometrically induced changes in flow field give rise to changes in the aerodynamic forces and moments acting on the aircraft and result in the state of the aircraft being changed in a transient way (e.g. moving an elevator, rudder or aileron gives rise to changes in pitch, yaw and roll attitude, respectively). These changes in attitude can be used to alter the direction the aircraft is moving in and/or to effect changes in its steady state trimmed condition, for example, to change its trimmed flight speed or to flying in a crosswind during take-off and landing.

Moveable flight control surfaces have traditionally been simple hinged devices forming part of the wing or tail structure and are deflected by mechanical, electrical or hydraulic means via the cockpit control or flight control computer on the aircraft. More recently research has been conducted to replace these devices with 'morphing structures' whereby the geometric changes to the aircraft shape takes place by building a structure that has tailored built-in 'compliance' that can be distorted by an actuator either of conventional design or embodying a smart material such as a piezoelectric or electroactive polymer.

However, these known flight control systems suffer from several drawbacks. They involve numerous moving parts which often suffer from issues related to reliability and maintenance. The required actuation systems can also contribute significantly to the weight and cost of the aircraft and occupy a significant proportion of the available volume within it.

A newer alternative approach is the use of so called 'fluidic controls'. The term 'fluidic controls' encompasses a wide range of approaches (examples of which include circulation control, leading edge blowing and fluidic thrust vectoring). They work on the principle of using the suction or blowing of air through engineered slots and/or holes located in appropriate places on the aircraft surface to change the way in which the external flow behaves. Fluidic flight control effectors can replace or supplement conventional control surfaces.

Warsop, C. and Crowther, W. J., "Fluidic Flow Control Effectors for Flight Control", AIAA Journal, Vol. 56, No. 10 (2018), pp. 3808-3824 describes an example of some of the principles of fluidic controls.

In the case of 'circulation control' air is blown through slots over a curved surface located in the trailing edge of a lifting surface (usually a wing, but it is equally applicable to tails and fins) to change the local flow characteristics in that region and, through a fluid dynamic coupling, the flow around the entire lifting surface. This change in the flow results in a change in the lift and moment acting on the lifting surface in a similar manner that deflecting a flap or conventional control surface would achieve.

In the case of fluidic thrust vectoring the injection of gas (usually compressor bleed air or bypass air) takes place through slots or holes within the exhaust nozzle of the jet engine. Combined with appropriate shaping of the nozzle geometry this fluid injection causes an asymmetry in the jet flow causing it to be deflected (vectored). The vectoring of the exhaust jet results in a change in the forces/moments it imparts about the centre of gravity of the aircraft, resulting in a change in aircraft attitude.

Fluidic flight controls such as circulation control and fluidic thrust vectoring may offer fewer moving parts and significant reductions in weight, volume and complexity.

Fluidic control requires the generation and distribution of high-pressure fluid from where it is generated, which is often the compressor of the main propulsion engine. Alternatively, the fluid may be from other sources, such as a compressor driven by an alternative power source (such as, but not exclusively by, a gas turbine APU or electric motor). The high-pressure fluid the passes via a control valve to the fluidic control effector, such as a flight control nozzles (slots/orifices) where it is ejected from the surface of the aircraft into the airflow it is intended to influence.

The control valves normally used to modulate (throttle) the mass flow and pressures of these air supplies are often of the 'butterfly' or 'sleeve' type and generally exhibit non-linear relationships between the positions of their control element and their flow output. This non-linearity combines with variabilities in the supply pressure and mass flow delivered to the flow control nozzle caused by changes in engine operating conditions (throttle setting) and flight conditions such as airspeed, pressure, temperature variations with altitude. The result of these non-linearities and variabilities means that there can be a complex relationship between the flight condition, throttle setting and the mass-flow/pressure delivered at the fluidic control effector and hence with the 'control effect' achieved. These non-linearities and flight condition dependencies therefore require a control system that takes account of all their influences and delivers the correct pressure and mass-flow for the conditions prevailing at the time a control input is demanded by the flight control system.

Conventional flight control systems, including autonomous or autopilot systems, usually require a good degree of linearity in the response of the aircraft to control input demands in order to simplify their qualification/certification requirements. For a conventionally controlled aircraft such linearity of control demand is easily achieved as a result of a control surface deflection/displacement (to which control effect is proportionally dependent) being easily measured and being independent of flight condition and engine throttle setting. However, as discussed above, in fluidic control there are non-linearities that conventional flight control systems are not equipped to deal with.

Similar problems also exist for underwater vehicles, such as unmanned/autonomous submarines. Conventional directional/movement control systems for such vehicles use hydraulic mechanisms to deflect hydroplanes. Replacing such mechanisms with fluidic control would offer technical advantages similar to those discussed above in relation to aircraft. Again, it may be beneficial for the autonomous vehicle control system of an underwater vehicle to be able to issue conventional/unmodified control demands (intended to deflect a conventional submarine control surface/hydroplane) and have them processed to control a fluidic control device (instead of the conventional submarine control surface/hydroplane) to accurately implement the control demand.

Embodiments of the present invention are intended to address at least some of the above technical problems.

SUMMARY

According to one aspect, there is provided a vehicle control system for use with at least one fluidic control effector for a vehicle, the vehicle control system comprising a controller, wherein the controller is configured to receive a vehicle control input indicating a demanded vehicle manoeuvre, wherein the input is further configured to receive condition data; determine a fluid mass-flow for the at least one fluid control effector based on the received vehicle control input and the condition data, wherein the relationship between the fluid mass-flow and the vehicle control input is substantially non-linear; and output data relating to the determined fluid mass-flow to effect the demanded vehicle manoeuvre, wherein the fluid mass-flow is determined to provide a substantially linear relationship between the vehicle control input and the effected demanded vehicle manoeuvre. Thus, embodiments can allow an autopilot or the like to 'see' the fluidic control effector as a linearly responding device (independent of current conditions, such as flight speed and throttle setting) in the same manner as conventional control surface.

In one example, the controller is configured to determine the pressure of fluid for the at least one fluid control effector based on the received vehicle control input and condition data.

The control system may be configured to control at least one control valve to provide the required mass-flow to the at least one fluidic control effector to effect the demanded vehicle manoeuvre.

The control system may be configured to determine a required position of a valve to enable valve to provide the required mass-flow to the at least one fluidic control effector to effect the demanded vehicle manoeuvre.

In one example, the condition data comprises one or more of:
 vehicle speed;
 altitude; and
 engine throttle position.

The condition data may comprise one or more of:
 fluid supply pressure;
 fluid supply temperature;
 fluid mass flow from the fluid control effector;
 velocity of fluid from the fluid control effector;
 pressure of local fluid outside of vehicle;
 temperature of local fluid outside of vehicle; and
 density of local fluid outside of vehicle.

The controller may comprise a processor configured to calculate the required fluid mass-flow; and a memory configured to store the required mass-flow.

The demanded vehicle manoeuvre may be an increment in pitching moment coefficient.

The vehicle control system may comprise a plurality of fluidic control effectors and a plurality of control valves, wherein each fluidic control effector is associated with a respective one of the control valves.

In one example, the control valve comprises a sleeve valve.

The control system according to any one of the preceding claims, wherein the fluid comprises air.

In one example, the vehicle control system comprises an autopilot system to provide the vehicle control input indicating the demanded vehicle manoeuvre.

The vehicle control system may comprise at least one compressor arranged to generate compressed fluid and in fluidic communication with the fluidic control effector.

According to another aspect, there is provided an aircraft comprising a vehicle control system according to any one of preceding claims for causing the aircraft to execute a manoeuvre.

The aircraft may be an unmanned aircraft.

In one example, the aircraft comprises a fuselage; first and second wing members disposed on opposite sides of the fuselage; and first and second fluidic control effectors, wherein the first fluidic control effector is disposed on an outer part of the first wing member and the second fluidic control effector is disposed on an outer part of the second wing member of the aircraft.

According to another aspect, there is provided a method of controlling a vehicle, comprising: receiving a vehicle control input indicating a demanded vehicle manoeuvre; receiving condition data; determining a required mass-flow rate required by at least one fluidic control effector to effect the vehicle manoeuvre based on the received vehicle control input and the condition data, wherein the relationship between the mass-flow demand and the vehicle control input is non-linear; and outputting data relating to the determined fluid mass-flow to effect the demanded vehicle manoeuvre, wherein the fluid mass-flow is determined to provide a substantially linear relationship between the vehicle control input and the effected demanded vehicle manoeuvre.

The method may include the steps of determining a control valve position based on the required mass-flow rate; and outputting data relating to the determined valve position to the control valve.

According to another aspect, there is provided a computer-readable storage medium comprising instructions which, when executed by a computer, cause the computer to perform a method substantially as described above.

Embodiments can use a local controller to operate a flow control valve that forms part of a fluidic control system of an autonomous vehicle. The controller can receive condition data produced by sensors on the vehicle, such as an aircraft, related to current conditions together with a-priori knowledge of the non-linear behaviour of the control valve pressure and mass-flow delivery with respect to its displacement. In the case of an aircraft the current conditions can include flight conditions (e.g. speed, angle of attack, etc) and engine throttle position. The controller can process this information, combined with feedback signals of pressure and temperature (which are related to nozzle exit mass-flow and velocity), to determine the control valve displacement required to achieve the necessary flow pressure and mass-flow at the fluidic control effector in response to a control demand from a vehicle controller, e.g. aircraft autopilot.

According to one aspect of the present invention there is provided a device adapted to generate a control signal for a fluidic control system of an autonomous vehicle and/or adapted to control a fluidic control system, the device comprising a processor configured to receive or be in communication with a first sensor set that receives condition data including flight speed, altitude and engine throttle position. The device may comprise (or be in communication with) a second sensor set that receives condition data including pressure and temperature of the fluid at the fluid control effector. The processor is configured to use a control demand from a vehicle controller, along with the data from the first sensor set and the second sensor set to determine a control signal for the fluidic control system.

According to another aspect of the present invention there is provided an autonomous vehicle control system, e.g. an autopilot, and/or a fluidic control system in communication with a device substantially as described herein.

According to another aspect of the present invention there is provided a vehicle, which may be fully or partially autonomous, comprising a device substantially as described herein.

According to another aspect of the present invention there is provided a method of controlling a fluidic control device of a fluidic control system of an autonomous vehicle, the method comprising:
  receiving a control demand from a vehicle operator;
  receiving current condition data relating to vehicle and fluid conditions, and
  processing the condition data to generate a modified control demand useable to control the fluidic control device to implement the control demand,
  wherein the processing comprises generating the modified control demand by generating a linearly responding change in force/moment coefficient in response to the control demand that is independent of current condition data and non-linear characteristics of the fluidic control device.

The fluidic control device may comprise a non-linear flow control valve for controlling a fluidic control effector. The modified control demand may comprise a signal for opening/closing the flow control valve to achieve the control demand.

The processing may comprise determining a displacement of the flow control valve required to achieve flow pressure and mass-flow at the fluidic control nozzle in response to the control demand. The processing may comprise calculating an increment in moment coefficient for the fluidic control effector.

The condition data may comprise sensor readings including flight speed, altitude, and/or engine throttle position. The condition data may further comprise sensor readings relating to exit mass-flow and velocity at the fluid control effector, e.g. pressure and temperature at a location of the flow control nozzle.

The change in force/moment coefficient may be computed as a function of blowing momentum coefficient $C_\mu$. The blowing momentum coefficient $C_\mu$ may be computed using an equation:

$$\Delta C_m = F\{C_\mu\}$$

where:
$\Delta C_m$=increment in moment coefficient
$C\mu$=blowing momentum coefficient
F=a function (often non-linear)

and where $C_\mu$ is defined as:

$$C_\mu = (m^\cdot V\_j)/(\tfrac{1}{2}\rho V^2)$$

where:
m˙=mass flow rate of blowing air
V_j=velocity of blowing air through the fluidic control nozzle
ρ=density of atmosphere at the flight altitude, and
V=flight velocity.

The demand data may be output by an autopilot component.

The method may further comprise transferring the modified control demand (such as output data relating to the required mass-flow) to the fluidic control device to implement the control demand.

It will be appreciated that features described in relation to one aspect of the present disclosure can be incorporated into other aspects of the present disclosure. For example, an apparatus of the disclosure can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION

Generally, embodiments herein relate to a fluidic control system for a vehicle. Fluid is taken from a vehicle engine, for example, a compressor within the engine and transferred to a fluid control effector via a control valve. The fluid is then expelled from the fluid control effector and interacts with external flow to affect the force on the vehicle. Hence, the fluid control effector can be used to control the position of the aircraft and effect a manoeuvre of the aircraft. However, as described above, conventional autopilot and manual systems have a substantially linear response, i.e. an input will have a substantially proportional control effect on the vehicle. Due to the increased complexity of fluidic control effectors compared with conventional control surfaces, there are several additional factors that effect the control of the vehicle. Therefore, the response of the fluid control effector is non-linear. The provision of a control system that interfaces with the vehicle demand input and the fluid control effector can remove the non-linear response, by processing all the relevant factors. Therefore, the response of the vehicle movement can be made to be substantially linear with respect to the vehicle demand input. Therefore, the complexity of the system is significantly reduced and there is no requirement to change existing pilot input systems such as existing autopilot systems.

For many years, researchers have been seeking alternatives to conventional moving control surfaces for controlling an aircraft in flight to reduce the impact that these moving devices have on weight, volume occupied, reliability, maintenance and cost. One such alternative approach is the use of so-called "fluidic control systems", which embodiments of the present disclosure improve upon. The general prior art concept is demonstrated broadly in FIG. 1. The term "fluidic control systems" encompasses a wide range of approaches, examples of which include circulation control, leading edge blowing and fluidic thrust vectoring.

Figure 1:
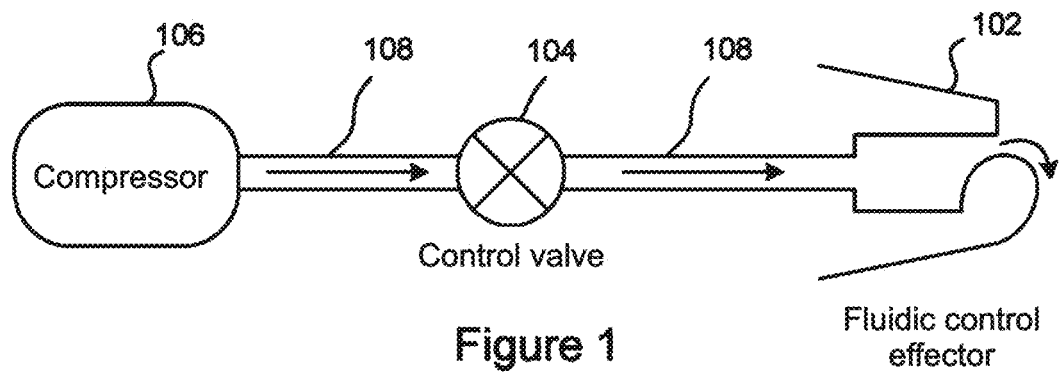
FIG. 1 is a schematic diagram of an example fluidic control system.

FIG. 1 shows a partial view of a fluidic control effector 102 that is fluidly coupled with a control valve 104. In some examples, a fluid, such as air, is bled off a vehicle engine and directed to the fluidic control effector 102 via the control valve 104. In some examples, the fluid is bled off a compressor 106 of the vehicle engine. The control valve 104 may be a sleeve valve or butterfly valve.

As described above, the fluidic control effector 102 may be located on a wing or tail surface of a vehicle, such as an aircraft. The fluid that passes through the fluidic control effector 102 will interact with the fluid passing over the surface of the vehicle to effect movement of the vehicle. The fluid is preferably air, and the vehicle is preferably an aircraft.

In one embodiment, when a control input is received, a controller controls a control valve by an amount depending on the amount of vehicle path deviation indicated by the control input.

Mass-flow is also known as mass transfer or bulk flow. It relates to the movement of fluids, such as air or water, down a pressure gradient.

As described above, each fluid control technique works on the principle of using the suction or blowing of air through engineered slots and/or holes located in appropriate places on the aircraft surface to change the way in which the external flow behaves. Some fluid control techniques involve blowing fluid over a curved surface or through a nozzle to change the local flow characteristics in that region and, through a 'fluid dynamic coupling', the flow around the entire lifting surface. This change in the flow results in a change in the lift and moment acting on the lifting surface in a similar manner that deflecting a flap or conventional control surface would achieve.

The combinations of slots and/or holes and curved surfaces or nozzle geometry are referred to generally as fluidic control effectors 102.

One specific example of a fluidic control effector 102 is a trailing edge circulation control characterized by the blowing of a tangential jet sheet through spanwise slots placed just upstream of a cylindrical trailing edge. The jet sheet remains attached to the cylindrical surface and entrains the air passing over the upper surface of the wing through the Coanda effect. As a consequence, circulation develops around the airfoil and a lift increment is generated in a similar way to that produced from a conventional trailing edge flap. By independently controlling blowing from the upper and lower slots on a trailing edge, it is possible to control wing circulation (lift) in both a positive and negative sense, thereby creating the same effect as a conventional control surface that may be deflected both upward and downward. The dual-slot circulation control concept can also be employed as a thrust/yaw generating device by operating both upper and lower blowing jets simultaneously. A further embodiment of the dual-slot concept also allows for operation at continuous blowing whereby a control valve is used to modulate the percentage of the total flow rate applied to the upper and lower slots at any point in time. The advantage of such a system tends to be the ability to generate full control authority while operating the engine at a continuous bleed condition, which, under some circumstances, may be better for engine performance.

Fluidic control systems require a source of high-pressure fluid, for which the usual source is the compressor stages of a gas turbine engine. However, in other examples, the vehicle may include a dedicated compressor independent of the main propulsion engine.

FIG. 1 shows a compressor 106 of the vehicle engine (or dedicated compressor) fluidly coupled to a control valve 104 via ducting 108. The control valve 104 is fluidly coupled to the fluidic control effector 102 via ducting 108. In some examples, the ducting 108 is metal piping. For example, the ducting 108 may be made of Inconel, which tends to have high strength and be resistant to high temperatures. The diameter of the ducting 108 is of the order of 25 mm up to about 100 mm depending on the vehicle size and whether the ducting 108 provides air for multiple fluidic control effectors 102 or is a side-branch delivering air to a single or small fluidic control effector 102. Typical installations in a military aircraft have a maximum ducting 108 diameter of around 50 to 75 mm.

Figure 2:
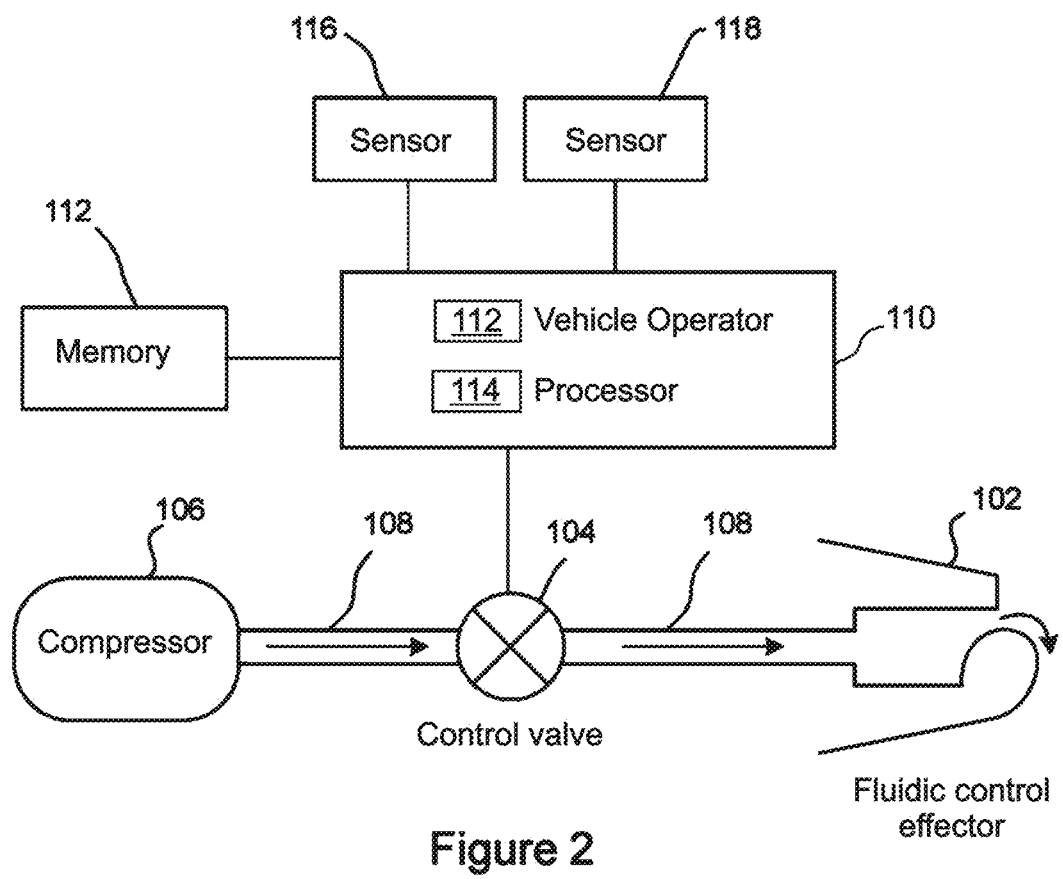
FIG. 2 is a schematic diagram of an example embodiment.

FIG. 2 shows a schematic system diagram according to one embodiment. Only features useful for understanding the embodiment are shown and other parts/components of the aircraft and the fluidic control system are not illustrated. While only one fluidic control effector 102 is shown in the illustrated embodiment, in other embodiments there may be more than one fluidic control effector 102. For example, a first fluidic control effector 102 may be disposed on the outboard end of the port wing, while a second fluidic control effector 102 may be disposed on the outboard end of the starboard wing, for example, and when operated synergistically they cause the aircraft to roll. The one or more fluidic control effectors 102 may additionally or alternatively be disposed on horizontal or vertical tail surfaces of an aircraft. The fluidic control effectors 102 may effectively replace an vehicles slats, flaps, flaperons, ailerons, elevators or rudders, or be used for vectored thrust. In one example, the fluidic control effectors 102 comprises a flow control nozzle.

The example embodiment includes a vehicle control system 110 for use with at least one fluidic control effector 102 for a vehicle. In its simplest form, the vehicle control system 110 comprises a controller 110 configured to interface with a vehicle operator 112 and receive a vehicle control input indicating a demanded vehicle manoeuvre. In one example, the vehicle control input relates to an increment in pitching moment coefficient.

The controller 110 is configured to determine a fluid mass-flow for the at least one fluid control effector 102 based on the received vehicle control input and the condition data, wherein the relationship between the fluid mass-flow and the vehicle control input is substantially non-linear.

The controller 110 is also configured to output data relating to the determined fluid mass-flow to effect the demanded vehicle manoeuvre, wherein the fluid mass-flow is determined to provide a substantially linear relationship between the vehicle control input and the effected demanded vehicle manoeuvre.

In some examples, the output data relating to the determined fluid mass-flow may be referred to as modified control data.

The controller 110 in the illustrated embodiment comprises a digital controller that may include a memory 112 and a processor 114. The memory 112 can contain data and instructions for processing/execution by the processor 114. Embodiments can be implemented using any suitable software, programming language, data editors, etc, and may be represented/stored/processed using any suitable data structures. In alternative embodiments, the controller 110 can be based on analogue computing elements, or an electro-mechanical-fluidic device.

The controller 110 may comprise further features, such as a wired/wireless communications interface, and so on, which need not be described herein in detail.

In the example embodiment the controller 110 receives vehicle control demands from a vehicle operator 112, for example, an aircraft operator. The vehicle operator 112 may input the vehicle control input through a user interface, such as a joystick or touchscreen. The vehicle may be manned or unmanned. Therefore, the vehicle operator 112 may be a human pilot, a remote pilot, or a software module that automatically determines a heading and altitude for the vehicle based on pre-determined parameters. For example, the controller 110 may receive control input from an autopilot. The controller 110 acts as an interface between the vehicle operator 112 and the valve 104 that controls the fluid mass-flow to the fluidic control effector 102. The controller 110 may be configured to use the vehicle control input or demand to determine the amount by which to open or close the control valve 104. The vehicle control input indicates a desired (demanded) change of heading, attitude or altitude of the vehicle (i.e. a change in direction of the aircraft). In one example, the vehicle control input relates to a change in pitching moment coefficient.

The controller 110 is configured to determine the fluid mass-flow to provide a substantially linear relationship between the vehicle control input and the effected demanded vehicle manoeuvre. In one example, the vehicle control system comprises an autopilot system to provide the vehicle control input indicating the demanded vehicle manoeuvre to the controller 110.

It will be appreciated that the controller 110 can be configured to receive/process control demands having any suitable content/format.

As described above, in conventional systems the control demand from the vehicle operator 112 is typically intended to control (e.g. deflect) a linearly-responding flight control surface. In this example, the controller 110 is configured generate a modified control demand (such as a required fluid mass-flow to the fluidic control effector 102) for effectively and correctly implementing the required control demand using the fluidic control effector 102, which does not have a linear response. However, as described above, the controller 110 is configured to determine an appropriate mass-flow through the fluidic control effector 102, to remove the non-linearities and dependencies on other factors, such as vehicle speed, altitude temperature, etc, such that the response of the vehicle to the required control demand is substantially linear.

The controller 110 is coupled to the flow control valve 104 and may generate output data relating to the determined fluid mass-flow to effect the demanded vehicle manoeuvre. This output data is used to fully or partially open/close the flow control valve 104, in other words, the output data is used to control the mass-flow of fluid through the flow control valve 104. As discussed above, the output data takes into account the various non-linear factors such that the response between the control demand from the vehicle operator 112 and the vehicle response becomes substantially linear.

To achieve this linear variation, the controller 110 is configured to receive data from one or more sensors 116, 118 related to condition data, such as vehicle condition and the flow conditions within the one or more fluidic control effectors 102.

The vehicle control system may therefore comprise (or be in communication with) one or more sensors 116, 118. In the example embodiment shown in FIG. 2, the controller 110 is in communication with a first sensor 116 or first sensor set 116 that obtains condition data regarding the vehicle condition, such as flight speed, altitude and engine throttle position. The controller 110 is also in communication with a second sensor 118 or second sensor set 118 that obtains condition data including pressure, temperature and velocity of the fluid passing through the fluidic control effector 102. In one example, the second sensor set 118 obtains readings including pressure and temperature in of the fluid in a plenum of at least one fluidic control effector 102. In some examples, a single sensor set 116, 118 may obtain readings relating to the vehicle condition and the pressure and temperature of the fluid passing through the fluidic control effector 102.

In some embodiments, instead of receiving data from a dedicated sensor set 116, 118, the controller 110 may receive the data from, for example, an existing component of the vehicle or flight control system that has received/generated data corresponding to the reading. In another example, the sensors 116, 118 may be part of the controller 110.

For a conventionally controlled aircraft the linearity of control demand is easily achieved as a result of a control surface deflection/displacement (to which control effect is proportionally dependent) being easily measured and being independent of flight condition and engine throttle setting. As such, the required deflection of a conventional control surface is substantially linearly dependent upon the vehicle control demand. For a conventional deflecting control surface, the incremental moment coefficient generated by a control surface is:

$$\Delta C_m = k_1 \cdot \delta \qquad (1)$$

where:

$\Delta C_m$ = increment in moment coefficient $k_1$ = a constant (for small control surface deflections in the usual deflection range)

$\delta$ = deflection angle of control surface

For a conventional flight control surface (deflecting leading or trailing edge control) the change in lift or moment coefficient it generates on the aircraft is generally linear with deflection (for deflections in the normal range) and independent of flight speed. Therefore, the control demand can be used to linearly deflect the control surface to achieve a linear change in lift or moment coefficient it generates on the aircraft.

On the other hand, the change in lift or moment coefficient generated by a fluidic control device is a non-linear function of blowing momentum coefficient $C_\mu$ as follows:

$$\Delta C_m = F\{C_\mu\} \qquad (2)$$

where:
ΔC_m=increment in moment coefficient
Cμ=blowing momentum coefficient
F=a function (often non-linear)
and where $C_\mu$ is defined as:

$$C_\mu = (m^{\cdot} V\_j)/(\tfrac{1}{2}\rho V^2) \quad (3)$$

where:
m˙=mass flow rate of 'blowing air' through the fluidic control effector 102.
V_j=velocity of 'blowing air' through the fluidic control effector 102.
ρ=density of atmosphere at the flight altitude
V=flight velocity Hence, the lift or moment coefficient generated by a fluidic flight control may be dependent on mass flow rate and pressure (pressure defines the velocity of 'blowing air' through the fluidic control effector 102) of the 'blowing air' supplied to the fluidic control effector 102 (which are throttle and valve displacement related), the flight speed and flight altitude.

Therefore, a fluidic flight control system, as explained above exhibits a strong dependency of the control effect on flight speed/altitude, the throttle setting and the non-linearities associated with the characteristics of the control valve 104.

Figure 3:
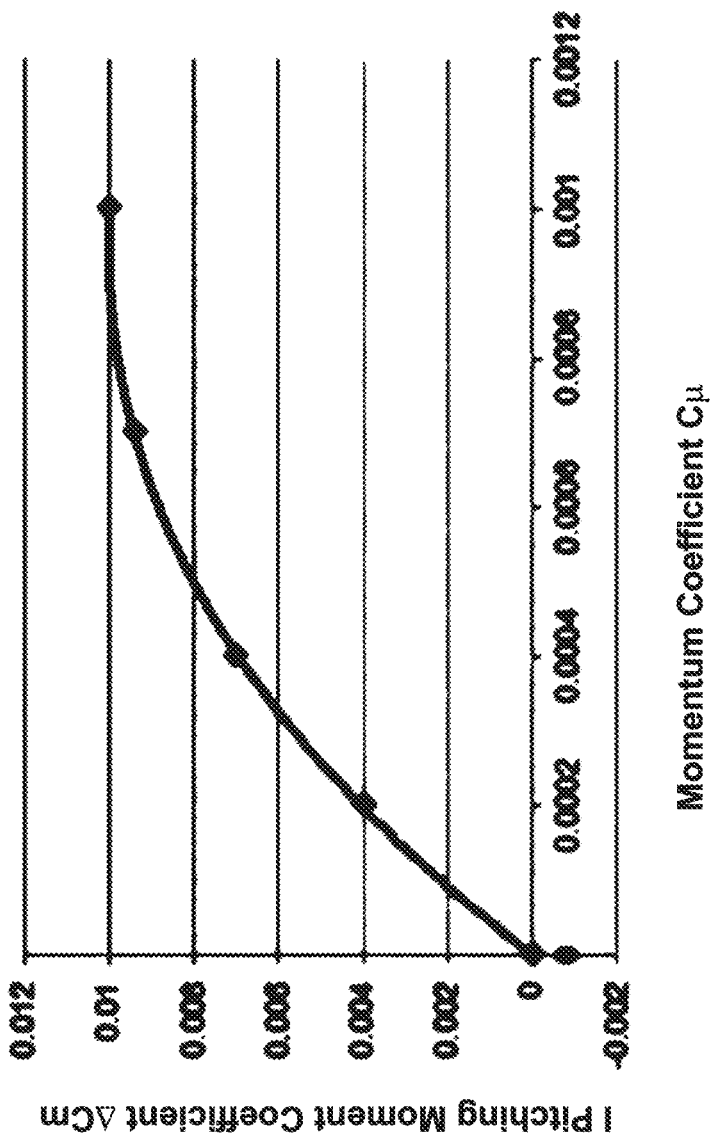
FIG. 3 shows a response curve of Pitching moment coefficient relative to momentum coefficient.

FIG. 3 shows an example of a transfer of a graph charting the pitching moment coefficient ΔC_m against moment coefficient Cμ. The pitching moment coefficient ΔC_m may be set by the vehicle operator 112 or derived from an input of the vehicle operator 112.

To remove the non-linear response for the fluidic control effector 102, the controller 110 may determine the moment coefficient Cμ. Cμ can be determined by either interpolating a look-up table representing the above curve or by using a representative curve fit, e.g.

$$C\mu = 0.000003(\Delta C_m^3 - 15907 \Delta C_m^3 + 23.3634 C_m) - 0.00005 \quad (4)$$

The next step is to convert this value of Cμ into a blowing mass flow $m_{dot}$ which in a simple representation can be obtained as follows:

$$m_{dot} = (0.5 \cdot p_{at} \cdot V_{tas}^2 \cdot S)/(R \cdot T_{at} \cdot Vj) \quad (5)$$

where:
$p_{at}$=The static pressure of the atmosphere at the altitude of flight (from the air data system on the aircraft);
$V_{tas}$=The true airspeed of the aircraft (from the air data system on the aircraft);
$T_{at}$=The static temperature of the atmosphere at the altitude of flight (from the air data system on the aircraft);
R=The characteristic gas constant of air;
$V_j$=The velocity of the jet that will exit from the fluidic control effector 102, which may be a function of the pressure and temperature of the engine bleed air. Note that this can be a function of altitude-[air pressure and temperature] and throttle setting (engine speed), the outside atmospheric air pressure. $V_j$ may be defined as:

$$V_j = M_j(\gamma \cdot R \cdot T_B) \quad (6)$$

where:
γ=Ratio of specific heats for air=1.4);
R=The characteristic gas constant of air;
$T_b$=The temperature of the fluid supplying the blowing slot or fluid control effector 102;
$M_j$=Mach number of the fluid coming from the blowing slot or fluid control effector 102 which can be derived from a knowledge of the pressure in the blowing slot plenum or fluid control effector 102. Note, this may be a function of engine rpm or can be derived form a direct pressure measurement in the plenum and the atmospheric pressure outside the slot or fluid control effector 102 using the following relationship:

$$Mj = 2.0/(\gamma - 1) \cdot \sqrt{\left[(Pb/Pat)^{\frac{\gamma}{\gamma-1}} - 1\right]} \quad (7)$$

where γ and $p_{at}$ are as defined above and:
$P_b$=pressure of bleed air in the blowing slot plenum or fluid control effector 102 which can be measured directly or defined as a function of engine RPM and altitude.

In order to allow a fluidic flight control to be designed and qualified it is therefore necessary account for these effects within the control system used to operate them. As described above, it is disadvantageous for these effects to be accounted for in an autopilot because it would further complicate the already complicated autopilot system.

The inventors have appreciated that it is better if the autopilot 'sees' the fluidic control effector 102 as a linearly behaving control surface that responds in much the same way as a conventional control surface. This can provide the advantages of making the autopilot simpler to design and qualify and avoids the need for replacing or modifying existing autopilot systems.

Thus, according to embodiments the controller 110 can interface between the vehicle operator 112 and the fluidic flight control valve 104 to modify the control demand from the vehicle operator 112 to produce output data. In some examples, the output data relates to a desired mass-flow of fluid through to the fluidic control effector 102. The output data may also include a required pressure of fluid through the fluidic control effector 102 based on the received vehicle control input and condition data.

In one example, the controller 110 can then output the output data to control the vehicle control valve 104. The intermediate step of producing the output data means that the change in force/moment coefficient for a vehicle operator 112 demand is independent of flight condition, throttle setting and non-linear valve characteristic. Therefore, the fluidic control effector 102 has a linear response relative to the vehicle demand of the vehicle operator 112.

In some embodiments the controller 110 can process the vehicle demand data, combined with condition data, to determine the control valve 104 displacement required to achieve the necessary mass-flow at the fluidic control effector to effect the control demand from the vehicle operator 112. In some examples, the controller 110 determines the flow pressure to the fluidic control effector 102. In some examples, the controller 110 may directly control the control valve 104 to set the desired mass-flow of fluid passing to the fluidic control effector 102. In other examples, the controller 110 may output a signal to the control valve 104 such that a local controller of the control valve to control the mass-flow of fluid passing through.

Thus, according to the example embodiment the controller 110 can receive a demand from the vehicle operator 112, obtain condition data from the sensors 116, 118, and calculate the increment in moment coefficient for the control valve 104 (using values derived from the sensors 116, 118), and output a modified vehicle demand control signal (e.g. output data relating to the required mass-flow) for controlling the non-linear control valve 104 to the extent required to achieve the control desired by the vehicle operator demand.

Calculations performed by the controller can be based on the equations (2), (3), (4), (5), (6) and (7) above or any mathematical equivalents/variations thereof, such as look-up tables. The skilled person will appreciate that the variables of the equation can be computed using the values provided by the sensors.

Thus, the controller 110 can control the fluidic thrust vectoring of the exhaust jet to change the aircraft attitude. It will be understood that alternative embodiments can operate in a different manner. For example, in some embodiments the controller 110 can be configured to output a modified control demand to a different type of control valve 104 that can receive flow from a source different to a bleed air duct to change the flow around a lifting surface in accordance with circulation control or leading-edge blowing techniques. Further, in alternative embodiments the controller may control more than one flow control valve, or it may be configured to control a component other than a valve that can directly control suction or blowing of fluid to change external flow behaviour.

According to embodiments the local controller 110 can allow a fluidic control system to be embodied within an aircraft using a traditional architecture of autopilot, which can allow for much simpler qualification and certification of the flight control system.

Figure 4:
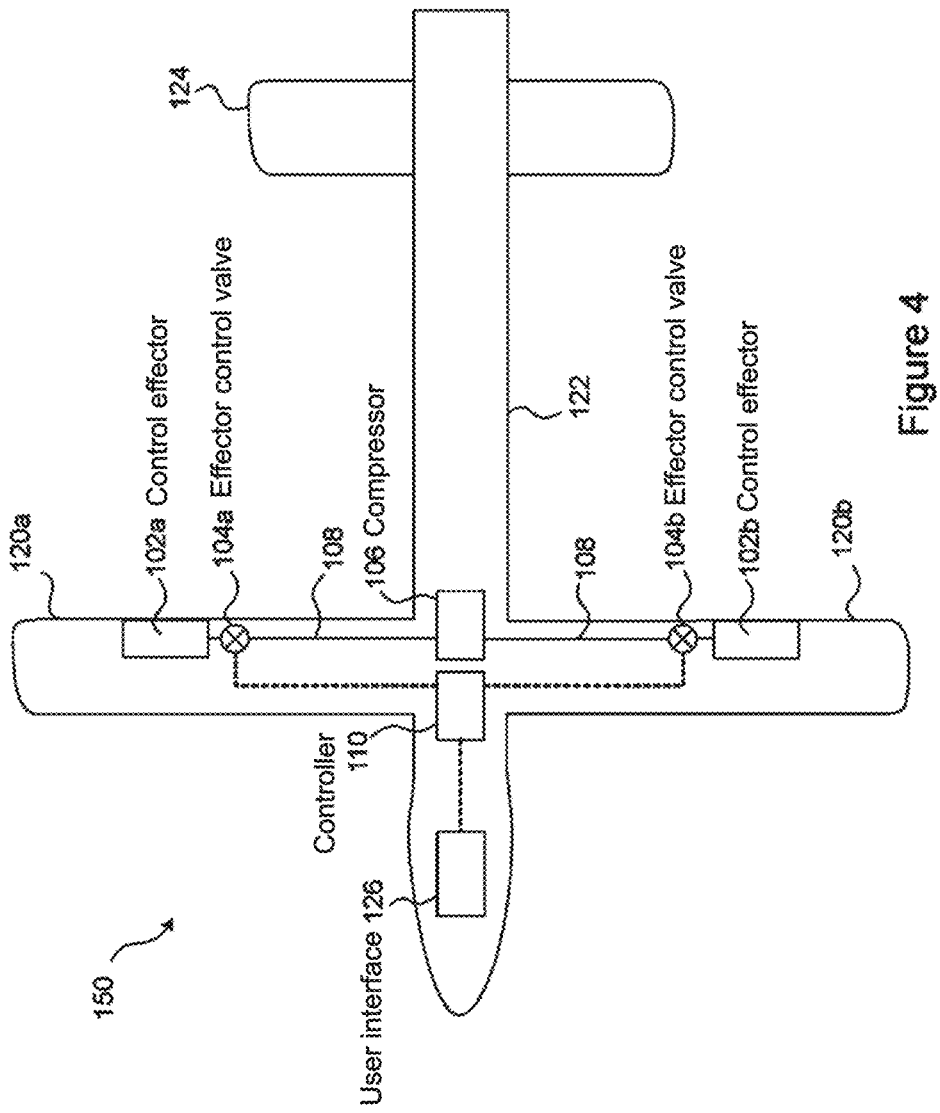
FIG. 4 shows an example of an aircraft including the fluidic control system.

An example of an aircraft 150 having an embodiment of the flight control system described with reference to FIG. 2 is shown in FIG. 4. The aircraft 150 includes wings 120a, 120b, a fuselage 122 and tail surfaces 124. The tail surfaces 124 may include horizontal and vertical stabilisers, or in other embodiments there may be a single stabiliser on either side of the fuselage 122 that can perform the function of a horizontal and vertical stabiliser. The vertical stabiliser may not be vertical. For example, in some embodiments the plane of the vertical stabiliser is arranged at about 45 degrees to the horizontal plane of the aircraft 150.

The aircraft 150 may include a user interface 126 for receiving flight control inputs from a vehicle operator 112. In other embodiments, where the aircraft 150 is unmanned, the user interface 126 may be remote from the aircraft 150. In some examples, the vehicle operator 112 is an autopilot system and the user interface 126 may be controlled by the vehicle operator 112.

The user interface 126 is electrically coupled to the controller 110. The controller 110 is electrically coupled to the effector control valves 104a, 104b. In this example, one effector control valve 104a is disposed in the starboard wing 120a and the other effector control valve 104b is disposed in the port wing 120b. The controller 110 may further be coupled to a dump valve. A compressor 106 may be fluidically coupled to the fluidic control effectors 102a, 102b disposed in the wings 120a, 120b via the effector control valves 104a, 104b. The effector control valves 104a, 104b control fluid mass-flow to respective fluidic control effectors 102a, 102b. The compressor 106 is coupled to the fluidic control effectors 102a, 102b by ducting 108.

In the illustrated embodiment, the first fluidic control effector 102a is a curved surface on the starboard wing 120a that, when air is blown over it, causes the starboard wing 120a to sink. The second fluidic control effector 102b is a curved surface on the port wing 120b that, when air is blown over it, causes the port wing 120b to sink. Therefore, by not blowing air through either fluidic control effector 102a, 102b, the aircraft 150 flies level, but can be banked by blowing air through either fluidic control effector 102a, 102b. To effect a shallow bank to starboard, the controller 110 may open the effector control valve 104a, 104b associated with the first fluidic control effector 102a by a small amount (for example, 20%).

In another embodiment, the first fluidic control effector 102a and second fluidic control effector 102b may be physically coupled to form a single unit on one wing. Another unit having two fluidic control effectors 102a, 102b may be disposed on the other wing of the aircraft 150. Here, a first fluidic control effector 102a in a pair may be adapted to generate lift on the respective wing 120a when air is blown through it and the second fluidic control effector 102b in the pair may be adapted to cause the wing 120b to sink when air is blown through it.

Figure 5:
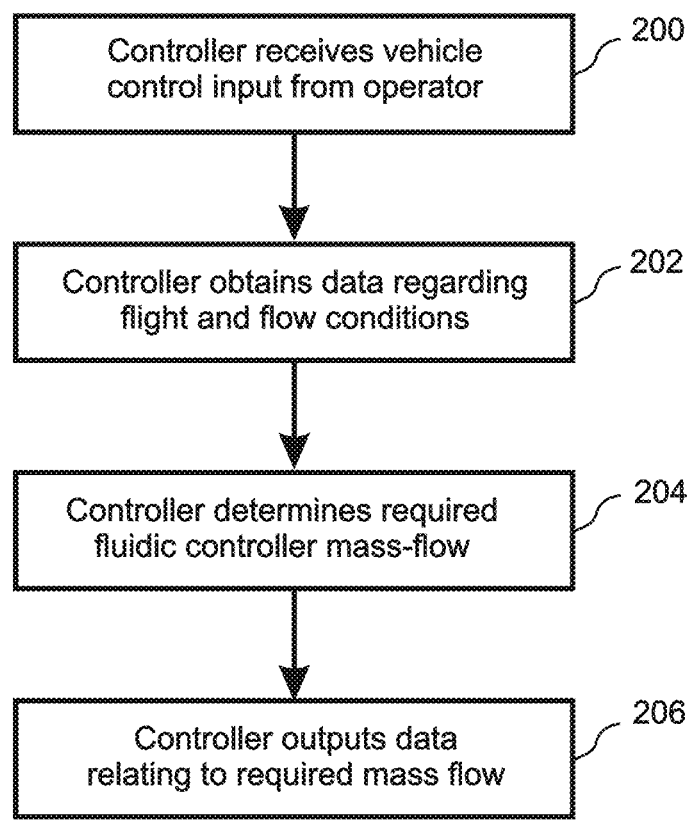
FIG. 5 shows an example of a method of operating the fluidic control system.

FIG. 5 shows an example of the method steps performed by the controller 110.

At step 200, the controller 110 receives a vehicle control input indicating a demanded vehicle manoeuvre from a vehicle operator 112. As described above, in one example, the vehicle operator 112 may be an autopilot system.

At step 202, the controller 110 obtains condition data related to flight condition and the flow conditions. In one example, the condition data related to flight condition and the flow conditions is received at the controller 110 from one or more sensors 116, 118. The controller 110 may request that the sensors provide the data or alternatively, the sensors constantly provide the controller 110 with the data. The data may include one or more of operational data of the vehicle such as flight speed, altitude, temperatures and bleed air parameters (e.g. pressure and temperature).

At step 204, the controller 110 determines the required mass-flow of fluid through the fluidic control effector 102. In one example, the controller 110 uses look-up tables, in-built functions or a combination of both to determine the required mass-flow of fluid through the fluidic control effector 102. The required mass-flow rate is determined based on the received vehicle control input and the condition data. The relationship between the mass-flow demand and the vehicle control input is non-linear At step 206, the controller 110 outputs data relating to the determined fluid mass-flow to effect the demanded vehicle manoeuvre. The fluid mass-flow is determined to provide a substantially linear relationship between the vehicle control input and the effected demanded vehicle manoeuvre.

In one example, the output data relates to the required mass-flow of fluid through the fluidic control effector 102 to a controller of the control valve 104 to enable the controller of the of the control valve 104 to determine the valve position or valve stem angle of the control valve 104 to achieve the required mass-flow of fluid. Alternatively, the controller 110 may determine the valve position of the control valve 104 to achieve the required mass-flow of fluid through the fluidic control effector 102 and send this position to the control valve 104 and/or control the control valve 104.

Figure 6:
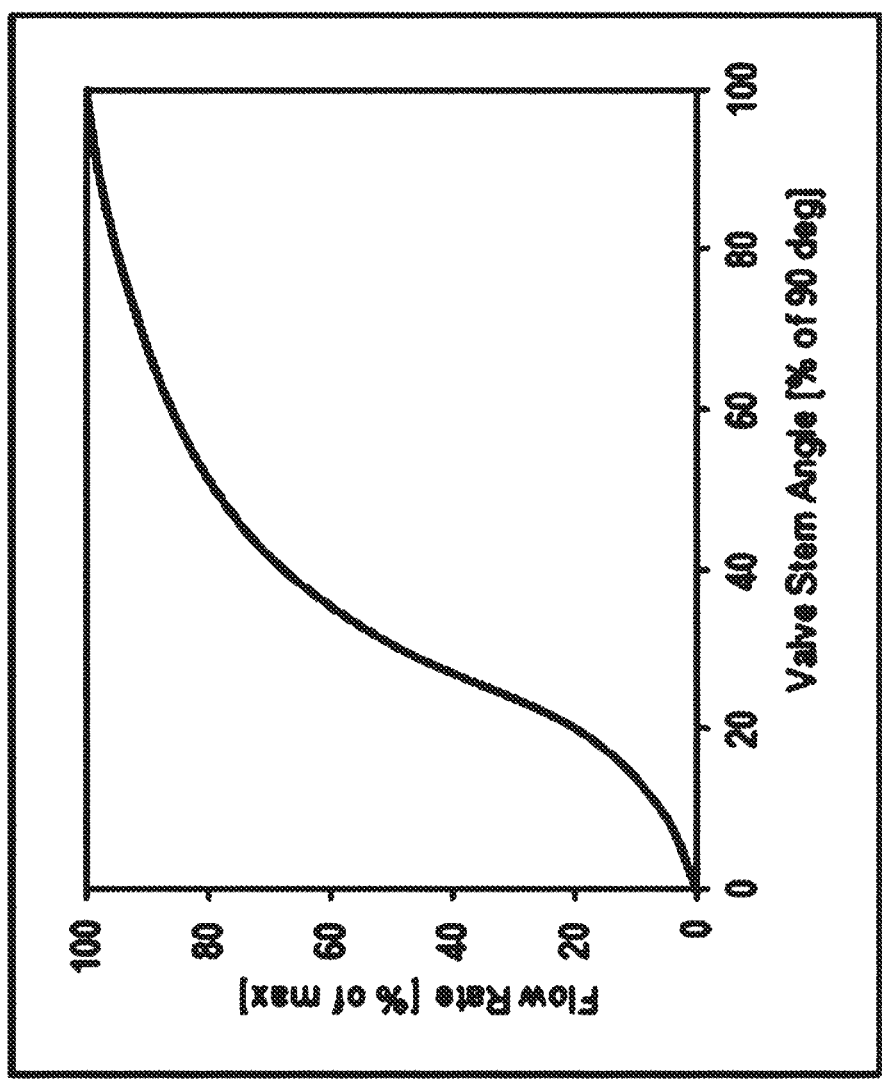
FIG. 6 shows a response curve of mass-flow rate relative to valve stem angle through a valve controller.

FIG. 6 shows an example of fluid flow rate through a control valve 104 with a varying valve stem angle. The flow rate along the Y-axis shows the percentage of maximum flow and the valve stem angle along the X-axis shows the percentage of the total angle of the valve stem angle, i.e. 100 percentage represents the valve being fully open and 0 percent represents the valve being fully closed. As can be shown from FIG. 6, the response of the flow rate relative to valve stem angle is substantially non-linear. Again, the controller can use look up tables or equations representing this curve to substantially remove the non-linearities.

Alternative embodiments can be configured to operate with the autonomous vehicle control system of an underwater vehicle so that its control demands are processed to control a fluidic control device of the underwater vehicle. The same equations may be used, but the fluid would comprise water instead of air.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A vehicle control system for use with at least one fluidic control effector for a vehicle, the vehicle being an aircraft, the vehicle control system comprising a controller, wherein the controller is configured to:
   receive a vehicle control input indicating a demanded rate of change of at least one of a heading, attitude and altitude of the vehicle;
   receive condition data, said condition data comprising at least one of a pressure of a local fluid outside of the vehicle, a temperature of the local fluid outside of the vehicle, and a density of t he local fluid outside of the vehicle;
   determine a required control fluid mass-flow for the at least one fluid control effector based on the received vehicle control input and the condition data, wherein a relationship between the control fluid mass-flow and the rate of change of the at least one of a heading, attitude and altitude of the vehicle is non-linear; and
   output data relating to the required control fluid mass-flow to effect the demanded rate of change of the at least one of a heading, attitude and altitude of the vehicle.

2. The vehicle control system according to claim 1, wherein the controller is configured to determine a control fluid pressure for the at least one fluid control effector based on the received vehicle control input and condition data.

3. The vehicle control system according to claim 1, wherein the control system is configured to control at least one control valve to provide the required control fluid mass-flow to the at least one fluidic control effector.

4. The vehicle control system according to claim 3, wherein the control system is configured to determine a required position of a valve to enable the valve to provide the required control fluid mass-flow to the at least one fluidic control effector.

5. The vehicle control system according to claim 1, wherein the condition data comprises one or more of:
   vehicle speed;
   vehicle altitude; and
   vehicle engine throttle position.

6. The vehicle control system according to claim 1, wherein the condition data comprises one or more of:
   control fluid supply pressure;
   control fluid supply temperature;
   control fluid mass flow from the fluid control effector; and
   velocity of control fluid from the fluid control effector.

7. The vehicle control system according to claim 1, wherein the controller comprises:
   a processor configured to calculate the required control fluid mass-flow; and
   a memory configured to store the required control fluid mass-flow.

8. The vehicle control system according to claim 1, wherein the vehicle control input is a demanded increment in a pitching moment coefficient.

9. The vehicle control system according to claim 1, further comprising a plurality of fluidic control effectors and a plurality of control valves, wherein each fluidic control effector is associated with a respective one of the control valves.

10. The vehicle control system according to claim 1, wherein the control valve comprises a sleeve valve.

11. The vehicle control system according to claim 1, wherein the control fluid comprises air.

12. The vehicle control system according to claim 1, further comprising an autopilot system to provide the vehicle control input.

13. The vehicle control system according to claim 1, further comprising:
   at least one compressor arranged to generate compressed fluid, the at least one compressor being in fluidic communication with the fluidic control effector.

14. An aircraft comprising a vehicle control system according to claim 1.

15. The aircraft according to claim 14, wherein the aircraft is an unmanned aircraft.

16. The aircraft according to claim 14, wherein the aircraft comprises:
   a fuselage;
   first and second wing members disposed on opposite sides of the fuselage; and
   first and second fluidic control effectors,
   and wherein the first fluidic control effector is disposed on an outer part of the first wing member and the second fluidic control effector is disposed on an outer part of the second wing member of the aircraft.

17. A method of controlling a vehicle that is an aircraft, the method comprising:
   receiving a vehicle control input indicating a demanded rate of change of at least one of a heading, attitude, and altitude of the vehicle;
   receiving condition data, said condition data comprising at least one of a pressure of a local fluid outside of the vehicle, a tempereature of the local fluid outside of the vehicle, and a density of the local fluid outside of the vehicle;
   determining a required mass-flow rate required by at least one fluidic control effector to effect the demanded rate of change of the at least one of a heading, attitude and altitude of the vehicle based on the received vehicle control input and the condition data, wherein a relationship between the control fluid mass-flow and the effected rate of change of the at least one of a heading, attitude, and altitude of the vehicle control input is non-linear; and outputting data relating to the required fluid mass-flow to effect the demanded rate of change of the at least one of a heading, attitude, and altitude of the vehicle.

18. The method according to claim 17, comprising:

determining a valve position of a control valve based on the required mass-flow rate; and outputting data relating to the determined valve position to the control valve.

19. A non-transient storage medium comprising instructions which, when executed by a controller of at least one fluidic control effector for a vehicle that is an aircraft, cause the controller to:

receive a vehicle control input indicating a demanded rate of change of at least one of a heading, attitude, and altitude of the vehicle;

receive condition data, said condition data comprising at least one of a pressure of a local fluid outside of the vehicle, a temperature of the local fluid outside of the vehicle, and a density of the local fluid outside of the vehicle;

determine a required control fluid mass-flow for the at least one fluid control effector based on the received vehicle control input and the condition data, wherein a relationship between the control fluid mass-flow and the rate of change of the at least one of a heading, attitude and altitude of the vehicle is non-linear; and output data relating to the determined control fluid mass-flow to effect the demanded rate of change of the at least one of a heading, attitude and altitude of the vehicle.

\* \* \* \* \*